(12) United States Patent
Wong et al.

(10) Patent No.: US 7,684,164 B2
(45) Date of Patent: Mar. 23, 2010

(54) AUTOMATIC POWER-OFF PROTECTION APPARATUS

(75) Inventors: Shih-Fang Wong, Taipei Hsien (TW);
Jun-Wei Zhang, Shenzhen (CN);
Wen-Jian Cui, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 119 days.

(21) Appl. No.: 11/773,980

(22) Filed: Jul. 6, 2007

(65) Prior Publication Data
US 2008/0062591 A1 Mar. 13, 2008

(30) Foreign Application Priority Data
Sep. 8, 2006 (CN) .................. 2006 1 0062529

(51) Int. Cl.
*H02H 3/00* (2006.01)
*H02H 11/00* (2006.01)
(52) U.S. Cl. .............................. 361/93.6; 307/326
(58) Field of Classification Search ............. 361/42, 361/93.6; 307/326
See application file for complete search history.

(56) References Cited

U.S. PATENT DOCUMENTS

| 4,042,967 | A  | * | 8/1977 | Yamamoto ............... 361/45 |
| 6,094,365 | A  |   | 7/2000 | Chiao |
| 6,294,767 | B1 | * | 9/2001 | Sargeant et al. ............. 219/519 |
| 6,707,652 | B2 | * | 3/2004 | Engel ........................ 361/42 |
| 2004/0169977 | A1 |   | 9/2004 | Kotula |

* cited by examiner

*Primary Examiner*—Albert W Paladini
*Assistant Examiner*—Michael Rutland Wallis
(74) *Attorney, Agent, or Firm*—Frank R. Niranjan

(57) ABSTRACT

An automatic power-off protection apparatus includes an alternating current (AC) input; an AC output connected to the AC input via power wires that comprises a naught wire and a live wire; a switching unit for enabling and disabling a connection between the AC input and the AC output; a first pair of coupling coils for producing a first induced AC voltage; a second pair of coupling coil for a second induced AC voltage; an operational amplifier for amplifying a voltage difference between induced voltages across the first secondary coil and the second secondary coil; a first and second comparator for comparing the amplified voltage difference with a first reference voltage and a second reference voltage respectively. The automatic power-off protection apparatus cuts off the path between the AC input and the AC output when detecting current leaks.

8 Claims, 1 Drawing Sheet

AUTOMATIC POWER-OFF PROTECTION APPARATUS

BACKGROUND

1. Field of the Invention

The invention relates to a protection apparatus, and particularly to an automatic power-off protection apparatus against leakage current.

2. Description of Related Art

Electrical appliances such as computers, washing machines, microwave-ovens, air-conditioners, refrigerators, and the like provides conveniences and better quality of life. However, these appliances must depend on electricity to function and this dependence has it drawbacks. One drawback is current leakage. Current leakage in a high humidity environment, such as in the bathroom is extremely dangerous. When someone enters a bathroom where there is a current leakage and a wet floor, the moisture may short circuit the electrical appliances, he or she could be electrocuted if he or she makes contact with the leakage current. Therefore, if the current leakage is not prevented, electrical appliances are a potential safety hazard.

Therefore, a heretofore need exists in the industry to overcome the aforementioned deficiencies and inadequacies.

SUMMARY OF THE INVENTION

An automatic power-off protection apparatus includes an alternating current (AC) input; an AC output connected to the AC input via power wires that includes a naught wire and a live wire; a switching unit for enabling and disabling a connection between the AC input and the AC output; a first pair of coupling coils including a first primary coil connected on the live wire and coupled to a first secondary coil for producing a first induced AC voltage thereacross when AC current flows through the first primary coil; a second pair of coupling coil including a second primary coil connected on the naught wire and coupled to a second secondary coil for producing a second induced AC voltage thereacross when AC current flows through the second primary coil; an operational amplifier for amplifying a voltage difference between induced voltages across the first secondary coil and the second secondary coil; a first comparator for comparing the amplified voltage difference with a first reference voltage and controlling the switching unit to switch off if the amplified voltage difference is higher than the first reference voltage; a second comparator for comparing the amplified voltage difference with a second reference voltage lower than the first reference voltage and controlling the switching unit to switch off if the amplified voltage difference is lower than the second reference voltage.

Other methods and features will be or become apparent to one with skill in the art upon examination of the following drawings and detailed description. It is intended that all such additional methods and features be included within this description, be within the scope of the present invention, and be protected by the accompanying claims.

DETAILED DESCRIPTION OF THE INVENTION

Figure 1:
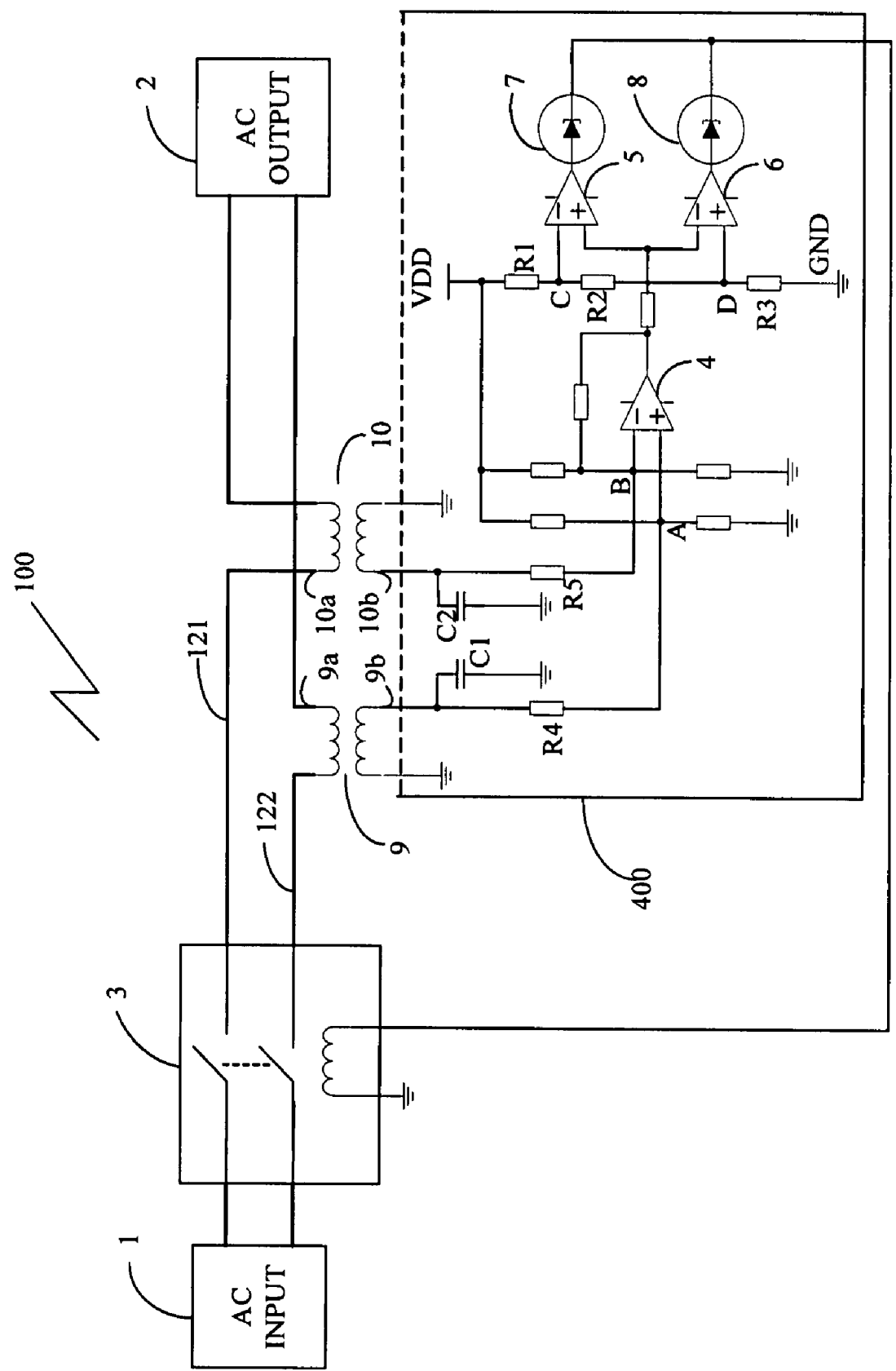
FIG. 1 is a schematic circuit diagram of a circuit protection apparatus in accordance with an preferred embodiment of the present invention.

FIG. 1 is a schematic circuit diagram of a circuit protection apparatus in accordance with a preferred embodiment of the present invention. The automatic power-off protection apparatus 100 includes an AC input 1 for connecting with an AC power supply (not shown), an AC output 2 for connecting with a power-consuming device (not shown). The AC output 2 is connected to the AC input 1 via power wires that includes a naught wire 121 and a live wire 122. The automatic power-off protection apparatus 100 further includes a switching unit 3 and a controlling unit 400. The switching unit 3 includes a switch component that connects the power wires and a coiled portion connected with a first diode switch 7 and a second diode switch 8. The first diode switch 7 includes an anode connected with an output of a first comparator 5 and a cathode connected with the switching unit 3. Similarly, the second diode switch 8 includes an anode connected with an output of a second comparator 6 and a cathode connected with the switching unit 3. The switching unit 3 enables and disables a connection between the AC input 1 and the AC output 2 according to the first diode switch 7 and the second diode switch 8. The switching unit 3 can be a relay switch, a thyristor switch, or other type of switching devices. In the preferred embodiment, a normally closed relay switch is employed as the switching unit 3.

The power wires are further installed with a first pair of coupling coils 9 and a second pair of coupling coils 10 that are both coupled with the controlling unit 400. The first pair of coupling coils 9 includes a first primary coil 9a connected on the live wire 122, and coupled to a first secondary coil 9b. The first secondary coil 9b includes a dotted terminal connected with a non-inverting input of an operational amplifier 4 via a resistor R4 and an undotted terminal grounded. The second pair of coupling coil 10 includes a second primary coil 10a connected to the naught wire 121, and a second secondary coil 10b. The second secondary coil 10b includes a dotted terminal connected with an inverting input of the operational amplifier 4 via a resistor R5 and an undotted terminal grounded. The first pair of coupling coils 9 produces a first induced AC voltage thereacross when AC current flows through the first primary coil 9a; the second pair of coupling coil 10 produces a second induced AC voltage thereacross when AC current flows through the second primary coil 10a. A first capacitor C1 is connected between the dotted terminal of the first secondary coil 9b and ground, and constitutes a resonant circuit with the first secondary coil 9b to filter noises. A second capacitor C2 is connected between the second secondary coil 10b and ground, and constitutes another resonant circuit with the second secondary coil 10b to filter noises. The controlling unit 400 further includes a first comparator 5 and a second comparator 6. An output of the operational amplifier 4 is connected both to a non-inverting input of the first comparator 5 and an inverting input of the second comparator 6.

The automatic power-off protection apparatus 100 includes a direct current (DC) voltage source VDD. The DC voltage source VDD supplies a DC voltage to a voltage dividing circuit that is connected between the DC voltage source VDD and ground and is made up by three voltage dividing resistors R1, R2, and R3 connected in series. The non-inverting input of the first comparator 5 is connected to a node C formed between the resistors R1, R2 and supplies a reference voltage Vc (hereinafter "the first reference voltage Vc") to the non-inverting input of the first comparator 5. The first comparator 5 compares the output of the operational amplifier 4 with the first reference voltage Vc and sends an output to the switching unit 3 via the first diode switch 7. The inverting input of the second comparator 6 is connected to a node D formed between the resistors R2, R3 and supplies a reference voltage Vd (hereinafter "the second reference voltage Vd") to the inverting input of the second comparator 6. The second comparator 6 compares the output of the operational amplifier 4 with the second reference voltage Vd and sends an output to the switching unit 3 via the second diode switch 8.

AC power goes through the naught wire 121 and the live wire 122. The first induced AC voltage V9 is induced across the first secondary coil 9b and is outputted to the non-inverting input of the operational amplifier 4. The second induced AC voltage V10 is induced across the second secondary coil 10b and is outputted to the inverting input of the operational amplifier 4. The operational amplifier 4 amplifies a voltage difference between the AC voltages V9 and V10 and outputs the amplified voltage difference Vout4 both to the first comparator 5 and the second comparator 6. The first comparator 5 compares the amplified voltage difference Vout4 with the first reference voltage Vc. The diode switch 7 conducts and transmits the output of the comparator 5 to the coiled portion of the switching unit 3 if the amplified voltage difference Vout4 is higher than the first reference voltage Vc. The second comparator 6 compares the amplified voltage difference Vout4 with the second reference voltage Vd. The diode switch 8 conducts and transmits the output of the comparator 6 to the coiled portion of the switching unit 3 if the amplified voltage difference Vout4 is lower than the second reference voltage Vd.

Under normal conditions, AC current flowing through the live wire 122 and the naught wire 121 are equal and opposite in direction. The induced AC voltages V9, V10 across the coupling coil 9, 10 respectively are stable, and the amplified voltage deference Vout4 varies between the first reference voltage Vc and the second reference voltage Vd. The first comparator 5 and the second comparator 6 output low level voltages that switches off the first diode switch 7 and the second diode switch 8 respectively. No current flows through the coiled portion of the switching unit 3 and the switching unit 3 maintains a closed state that enables AC supply to the AC output 2 from the AC input 1.

Sometimes, the AC current flowing through the live wire 122 and the naught wire 121 are not equal, this is because a leakage current exists in electronic devices. If this abnormal conditions occurs, accordingly a relatively high voltage difference between the AC current flowing through the live wire 122 and the naught wire 121 exists. For example, if the voltage value of the current flowing through the live wire 122 is greater than that of the current flowing through the naught wire 121, it will cause an amplified voltage difference outputted by the operational amplifier beyond the first reference voltage Vc. Then the first diode switch 7 switches on, and actives the switching unit 3, thus cutting off the AC current from the AC input 1 to the AC output 2. If the voltage value of the AC current flowing through the live wire 122 is smaller than that of the AC current flowing through the naught wire 121 and the amplified voltage difference Vout4 outputted by the operational amplifier decreases below the second reference voltage Vd, the second diode switch 8 switches on, and opens the switching unit 3, thus cutting off the AC current from the AC input 1 to the AC output 2 and provides protection when detecting current leaks.

The automatic power-off protection apparatus 100 has other embodiments. For example, the first primary coil 9a of the first pair of coupling coils 9 can be connected on the live wire 122 instead of the naught wire 121, and the dotted terminal of the first secondary coil 10a can be connected with the inverting input of the operational amplifier 4 via a resistor R4 instead of the non-inverting input of the operational amplifier 4 and the undotted terminal grounded. The second primary coil 10b of the second pair of coupling coil 10 can be accordingly connected on the naught wire 121 in stead of the live wire 122, and the dotted terminal of the second secondary coil 10b can be connected with the non-inverting input of the operational amplifier 4 via a resistor R5 in stead of the inverting input and the undotted terminal grounded.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. An automatic power-off protection apparatus comprising:
   an alternating current (AC) input;
   an AC output connected to the AC input via power wires that comprises a naught wire and a live wire;
   a switching unit for enabling and disabling a connection between the AC input and the AC output;
   a first pair of coupling coils comprising a first primary coil connected on the live wire and coupled to a first secondary coil for producing a first induced AC voltage thereacross when AC current flows through the first primary coil;
   a second pair of coupling coil comprising a second primary coil connected on the naught wire and coupled to a second secondary coil for producing a second induced AC voltage thereacross when AC current flows through the second primary coil;
   an operational amplifier for amplifying a voltage difference between induced voltages across the first secondary coil and the second secondary coil;
   a first comparator for comparing the amplified voltage difference with a first reference voltage and controlling the switching unit to switch off if the amplified voltage difference is higher than the first reference voltage;
   a second comparator for comparing the amplified voltage difference with a second reference voltage lower than the first reference voltage and controlling the switching unit to switch off if the amplified voltage difference is lower than the second reference voltage.

2. The automatic power-off protection apparatus according to claim 1, further comprising a first diode that is switched on by the first comparator and thus controls the switching unit to switch off if the amplified voltage difference is higher than the first reference voltage.

3. The automatic power-off protection apparatus according to claim 2, further comprising a second diode that is switched on by the second comparator and thus controls the switching unit to switch off if the amplified voltage difference is lower than the second reference voltage.

4. The automatic power-off protection apparatus according to claim 3, wherein the switching unit is a relay switch comprising a switch component installed on the power wires and a coiled portion connected with the first diode switch and the second diode switch.

5. The automatic power-off protection apparatus according to claim 3, wherein the switching unit is a thyristor switch controlled by the first diode switch and the second diode switch.

6. The automatic power-off protection apparatus according to claim 1 further comprising a first capacitor connected between the first secondary coil and ground for constituting a resonant circuit with the first secondary coil to filter noises.

7. The automatic power-off protection apparatus according to claim 1 further comprising a second capacitor connected between the second secondary coil and ground for constituting a resonant circuit with the second secondary coil to filter noises.

8. The automatic power-off protection apparatus according to claim 1, wherein the switching unit switches on when the amplified voltage difference ranges between the first reference voltage and the second reference voltage.

* * * * *